United States Patent [19]
Tanaka

[11] Patent Number: 5,909,318
[45] Date of Patent: Jun. 1, 1999

[54] THREE-GROUP ZOOM LENS

[75] Inventor: Takashi Tanaka, Kawagoe, Japan

[73] Assignee: Fuji Photo Optical Co., Ltd., Omiya, Japan

[21] Appl. No.: 09/030,763

[22] Filed: Feb. 26, 1998

[30] Foreign Application Priority Data

Apr. 18, 1997 [JP] Japan ................. H09-116359

[51] Int. Cl.⁶ ........................................ G02B 15/14
[52] U.S. Cl. ................................ 359/689; 359/687
[58] Field of Search .......................... 359/689, 687

[56] References Cited

U.S. PATENT DOCUMENTS

| | | |
|---|---|---|
| 4,465,343 | 8/1984 | Horimoto . |
| 4,647,160 | 3/1987 | Ikemori . |
| 5,737,127 | 4/1998 | Tsutsumi ........................... 359/684 |

FOREIGN PATENT DOCUMENTS

| | | |
|---|---|---|
| 57-19710 | 2/1982 | Japan . |
| 57-26816 | 2/1982 | Japan . |
| 59-18917 | 1/1984 | Japan . |
| 59-31922 | 2/1984 | Japan . |
| 3-240011 | 10/1991 | Japan . |

*Primary Examiner*—Georgia Epps
*Assistant Examiner*—Michael A Lucas
*Attorney, Agent, or Firm*—Arnold International; Bruce Y. Arnold

[57] ABSTRACT

A three-group zoom lens having lens groups, in order from the photographic object side, of negative, positive, and positive refractive power. The zoom lens is specially designed for use in a still or video camera employing a CCD array positioned at a fixed photographic image plane. Zooming is primarily performed by moving the two lens groups nearest the photographic object side, and focusing is primarily performed by adjusting the position of the lens group nearest the photographic image side. By satisfying certain conditional expressions a distance from the exit pupil to the photographic image plane is maintained to prevent shading, a back focus length sufficient to accommodate a filter component is provided, and a compact zoom lens of high quality is obtained.

8 Claims, 4 Drawing Sheets

EMBODIMENT 1

EMBODIMENT 2

THREE-GROUP ZOOM LENS

BACKGROUND OF THE INVENTION

Heretofore, there have been three-group zoom lenses for every type of camera. Three-group zoom lenses are compact and are widely used. Examples of such lenses are disclosed in Japanese Laid-Open Patent Publication 3-240011, Japanese Laid-Open Patent Publication 59-31922 and in U.S. Pat. No. 4,647,160. However, the rapid dissemination of digital cameras and video cameras in recent years, coupled with the increased demand for small lenses having a high picture quality and low distortion, as in general cameras, has necessitated the satisfaction of unique conditions when employing fixed photographic image elements, such as CCD arrays.

In contrast to film, CCD arrays as used in digital cameras and video cameras can receive light efficiently only when the incident luminous flux is nearly perpendicular to the photographic image plane. For example, in the case of zoom lenses with a two-group construction of a positive group and a negative group, as used frequently in 35 mm compact cameras, the incidence angle onto the photographic image plane increases as the image height reaches the periphery of the image plane. This is especially true if the distance from the exit pupil to the photographic image plane is short. When using such an optical system to image optical flux onto a CCD array, the peripheral luminance will be greatly reduced as compared to that at the center of the image, and the so-called "shading" effect occurs. Accordingly, as a condition for satisfactorily using a two-group zoom lens for photographic imaging onto a CCD array, it becomes necessary to move the exit pupil to a position sufficiently remote from the photographic image plane.

However, with digital cameras and video cameras, autofocus is commonly a feature that is desired, and high speed focusing is often favored. For this reason, what is known as the inner focusing method and the rear focusing method are frequently used as focusing methods for zoom lenses in order to allow the zoom lens to be light-weight and for easily allowing the zoom lens focus position to be driven close to the camera body side.

BRIEF SUMMARY OF THE INVENTION

The present invention relates to a three-group zoom lens, and especially to a three-group zoom lens having a fixed photographic image element for use in a digital camera or a video camera. The objects of the present invention are to provide a three-group zoom lens that is compact, has favorable aberrations that yield a high picture quality, avoids shading, and provides high-speed focusing.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
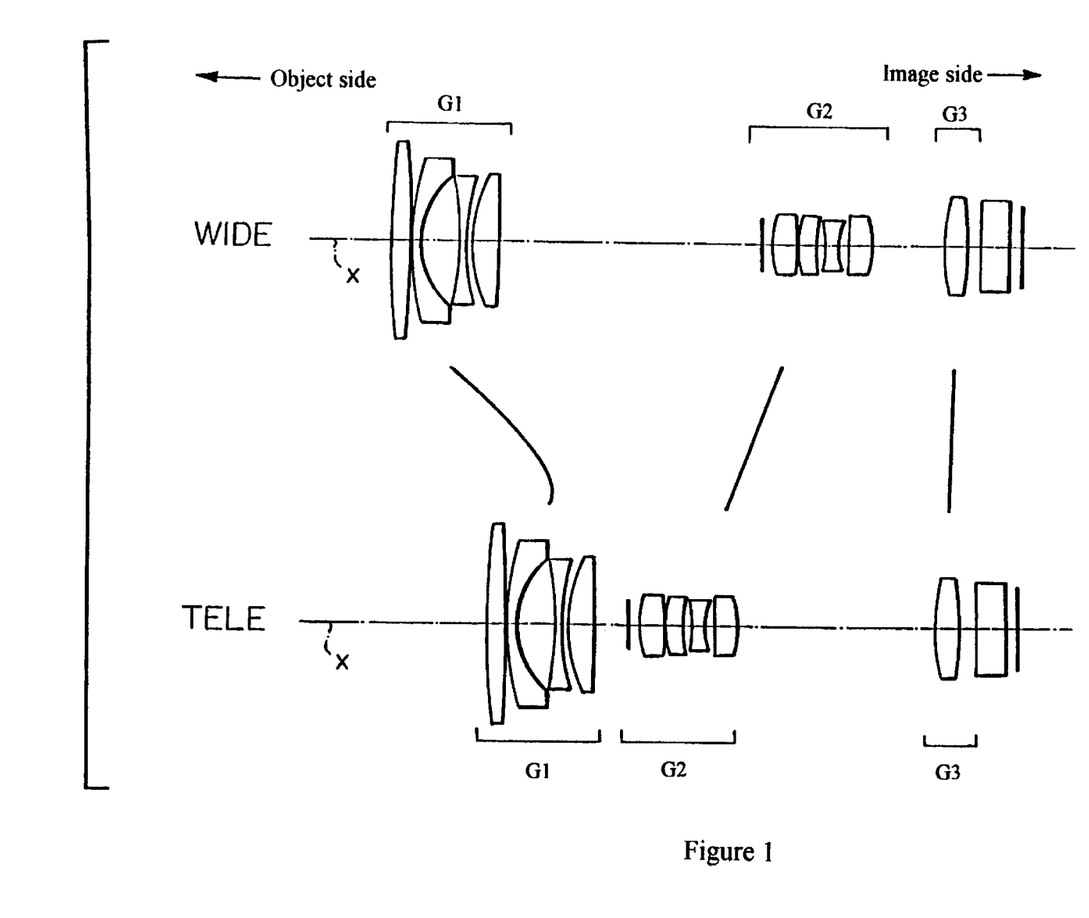
FIG. 1 shows the relative positioning of the elements of the compact zoom lens according to the present invention in the maximum wide-angle state and the maximum telephoto state, respectively.

FIG. 1 illustrates the approximate relative positioning of the elements of the compact zoom lens according to the present invention when in the maximum wide-angle state and the maximum telephoto state, respectively. The three-group zoom lens of the present invention for forming an image of an object onto a fixed image element arranges, in order from the photographic object side, a first lens group G1 having a negative refractive power, a second lens group G2 having a positive refractive power, and a third lens group G3 having a positive refractive power. The present invention is comprised so that, when zooming from the maximum wide-angle state to the maximum telephoto state, each of these lens groups are moved along the optical axis X so that the spacing between the first lens group G1 and the second lens group G2 is shortened, and the spacing between the second lens group G2 and the third lens group G3 is lengthened. When focusing from an infinite distance to a near distance, the third lens group G3 moves to the photographic object side. A shutter stop 2 is arranged as part of the second lens group G2 in order to adjust the amount of light. Further, the three-group zoom lens of the present invention satisfies conditional expressions (1) and (2) below.

$$0.8 < D_{wm}/f_3 < 1.1 \quad (1)$$

$$1.5 < D_{ti}/f_3 < 1.7 \quad (2)$$

where $D_{wm}$ is the distance from the position of the shutter stop to the on-axis position of the lens surface on the extreme image-side of the third lens group at the time of nearest focusing when in the maximum wide-angle state, $f_3$ is the focal distance of the third lens group, and $D_{ti}$ is the distance from the position of the shutter stop to the on-axis position of the lens surface on the extreme image-side of the third lens group at the time of infinite-distance focusing when in the maximum telephoto state.

The following conditions are recommended: at the extreme photographic object side of the second lens group G2 a shutter stop 2 should be provided for adjusting the amount of light that reaches the image plane; the third lens group should be composed of a double convex lens; and the following conditional expression (3) should be satisfied.

$$0.15 < B_{ft}/f_3 < 0.25 \quad (3)$$

where $B_{ft}$ is the back focus length at the time of infinite-distance focusing in the maximum telephoto state, and $f_3$ is as defined above.

Figure 2:
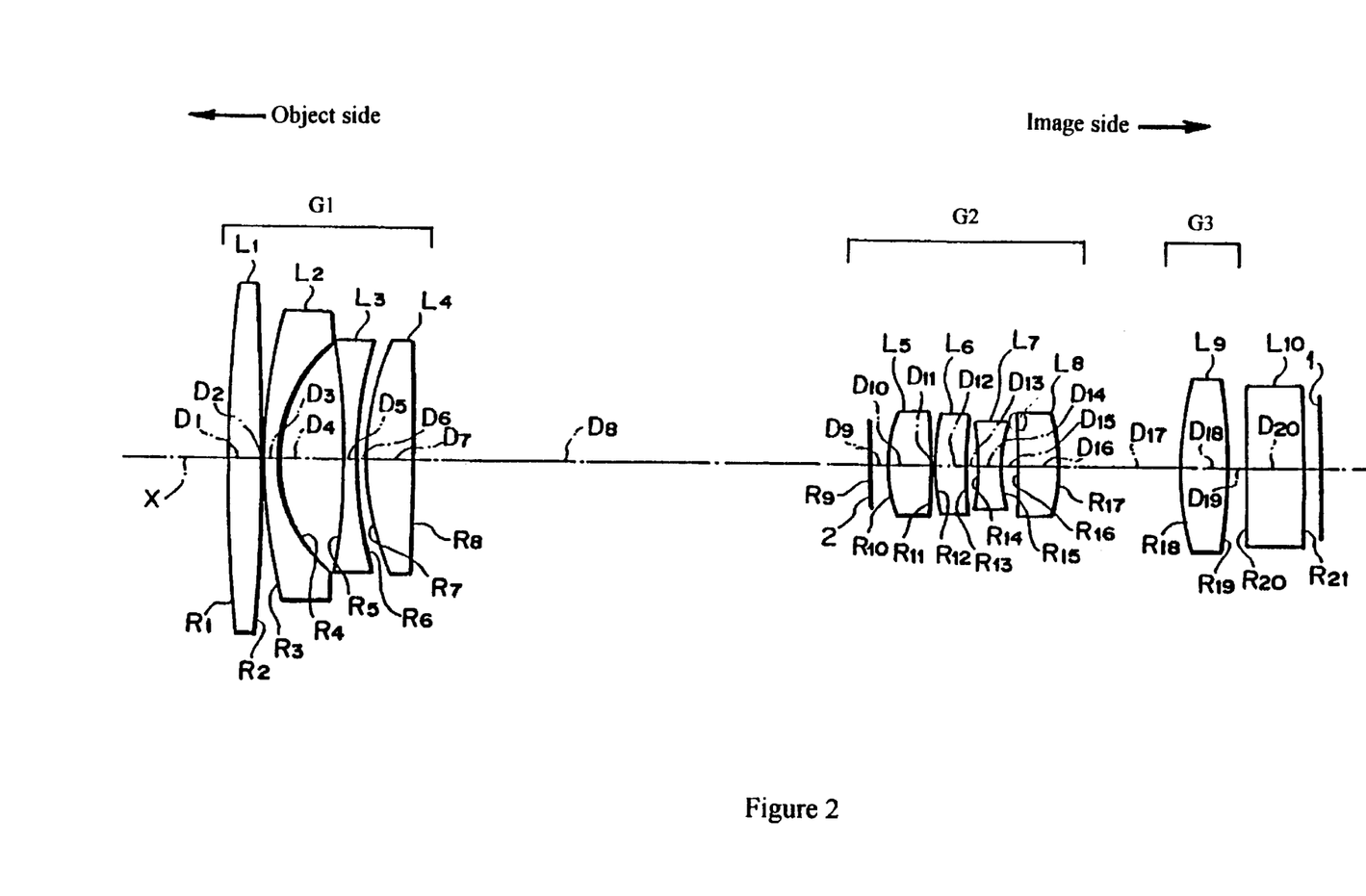
FIG. 2 shows the arrangement of the elements of the compact zoom lens according to the present invention.

FIG. 2 shows the arrangement of the elements of the compact zoom lens according to the present invention. The first lens group G1 is composed of four lens elements including, in order from the photographic object side, a positive lens, a negative meniscus lens with its concave surface on the image side, a double concave lens, and a positive lens having a surface of stronger curvature on the photographic object side. The second lens group G2 is preferably composed of the shutter stop 2 at the extreme object side, and four lens elements including, in order from the photographic object side, a double convex lens, a positive meniscus lens with its convex surface on the photographic object side, a double concave lens, and a positive lens having a surface of stronger curvature on the photographic image side. The third lens group G3 is composed of a double convex lens. In addition, the zoom lens satisfies conditional expression (4) below.

$$2.1 < f_2/f_w < 2.7 \qquad (4)$$

where
  $f_2$ is the focal distance of the second lens group, and
  $f_2$ is the focal distance of the three-group zoom lens when in the maximum wide-angle state.

The above conditional expressions (1) and (2) ensure a suitable magnification while providing for sufficient space between the exit pupil position and the photographic image plane to accommodate a filter component L10, such as an infra-blocking filter and/or a low pass filter. When the lower limit of conditional expression (1) is exceeded, the distance from the exit pupil to the image plane becomes too short to accommodate the filter component L10 when in the maximum wide-angle state. On the other hand, when the upper limit of conditional expression (1) is exceeded, magnification near 3× becomes very difficult to obtain. When the lower limit of conditional expression (2) is exceeded, magnification near 3× becomes very difficult to obtain. On the other hand, when the upper limit of conditional expression (2) is exceeded, the distance form the pupil exit position to the image plane becomes too short to accommodate the filter component L10 when in the maximum telephoto state.

Conditional expression (3), above, is an expression for regulating the image magnification of the third lens group when in the maximum telephoto state, thereby providing an appropriate back focus length in which to accommodate filter component L10. Further, conditional expression (3) includes a necessary condition which allows for simplification of the composition of the third lens group. When the lower limit of conditional expression (3) is exceeded, the back focus becomes too short to accommodate filter component L10 between the third lens group and the photographic image plane 1 when in the maximum telephoto state. On the other hand, when the upper limit of conditional expression (3) is exceeded, the back focus becomes too long, increasing the size of the aberration fluctuations in the image plane caused by focusing, and thereby making it difficult to construct the third lens group using only a single lens element.

Conditional expression (4), above, is an expression for insuring a suitable refraction power for the second lens group. When the lower limit of conditional expression (4) is exceeded, the length of the three-group zoom lens becomes too short, and the refractive power required of the second lens group becomes too great, thereby making it impossible to suppress the aberration fluctuations which accompany such refractive power. On the other hand, when the upper limit of conditional expression (4) is exceeded, the amount of movement of the second lens group which accompanies magnification becomes larger, and the total length of the optical system not only gets longer, but a condition is created whereby, since the amount of fluctuation in the exit pupil position due to magnification gets larger, the distance from the exit pupil to the image plane becomes too small to accommodate filter component L10.

Two embodiments of the present invention will now be described using actual numerical values.

Embodiment 1

The three-group zoom lens of the first embodiment is composed of, in order from the photographic object side, a first lens group G1 having negative refractive power, a second lens group G2 having positive refractive power, and a third lens group G3 having positive refractive power. The first lens group G1 and the second lens group G2 are moveable for zooming, and the third lens group G3 moves a minute distance for focus adjustment. No focus adjustment is required, however, when the zoom lens is in the maximum telephoto state. In addition to changing the focal distance f of the entire system by moving these three lens groups along the optical axis X, a zoom lens which allows efficient collection of the luminous flux onto the image formation plane 1 can be composed so as to satisfy the conditional expressions (1)–(4) above.

In addition, the first lens group G1 arranges, in order from the photographic object side, a first lens element L1 composed of a double convex lens with a stronger curvature surface on the photographic object side, a second lens element L2 composed of a negative meniscus lens with its concave surface on the photographic image side, a third lens element L3 composed of a double concave lens with a stronger curvature surface on the photographic image side, and a fourth lens element L4 composed of a double convex lens with a stronger curvature surface on the photographic object side. The second lens group G2 arranges, in order from the photographic object side, a shutter stop, a fifth lens element L5 composed of a double convex lens with a stronger curvature surface on the photographic object side, a sixth lens element L6 composed of a positive meniscus lens with its concave surface on the photographic image side, and a seventh lens element L7 composed of a double concave lens with a stronger curvature surface on the image side, and an eighth lens element L8 composed of a double convex lens with a stronger curvature surface on the photographic image side. The third lens group G3 arranges, in order from the photographic object side, a ninth lens element L9 composed of a double convex lens with a stronger curvature surface on the photographic object side. Furthermore, filter component L10 may be arranged between the third lens group G3 and the image plane 1 (i.e., between L9 and a CCD array which may be located at image plane 1).

Table 1, below, shows the values of the radius of curvature R (in mm) of each lens element surface, the on-axis surface spacing D (in mm), as well as the values of the index of refraction $n_d$ and the Abbe number $v_d$ (for the sodium d line) of each lens element of the zoom lens which apply to embodiment 1. The surface numbers # in the table indicate the surface order from the photographic object side. In the lower section of Table 1, the values for the focal distance f, the F number $F_{No.}$ and the angle of view $2\omega$ are given.

TABLE 1

| # | R | D | $n_d$ | $v_d$ |
|---|---|---|---|---|
| 1 | 122.395 | 2.700 | 1.74399 | 44.8 |
| 2 | −246.925 | 0.150 | | |
| 3 | 42.223 | 1.200 | 1.81600 | 46.6 |
| 4 | 10.859 | 5.147 | | |
| 5 | −48.119 | 1.200 | 1.71299 | 53.9 |
| 6 | 30.098 | 0.700 | | |
| 7 | 20.463 | 3.700 | 1.80099 | 35.0 |
| 8 | −385.560 | variable distance 1 | | |
| 9 | shutter stop | 1.500 | | |
| 10 | 13.401 | 3.500 | 1.81600 | 46.6 |
| 11 | −61.489 | 0.150 | | |
| 12 | 16.619 | 2.700 | 1.74320 | 49.3 |
| 13 | 26.334 | 0.936 | | |
| 14 | −18.840 | 2.000 | 1.80518 | 25.4 |

TABLE 1-continued

| # | R | D | $n_d$ | $v_d$ |
|---|---|---|---|---|
| 15 | 10.311 | 1.322 | | |
| 16 | 787.376 | 3.200 | 1.78800 | 47.4 |
| 17 | −17.717 | variable distance 2 | | |
| 18 | 25.182 | 3.500 | 1.51680 | 64.2 |
| 19 | −38.026 | variable distance 3 | | |
| 20 | ∞ | 4.200 | 1.51680 | 64.2 |
| 21 | ∞ | | | |
| f = 9.01 mm–25.23 mm | | $F_{No.}$ = 3.52–5.48 | | 2ω = 64.9°–25.2° |

Table 2, below, indicates the ranges for variable distance 1, variable distance 2, and variable distance 3 which are applicable when zooming from the maximum wide-angle state (f=9.01 mm) to the maximum telephoto state (f=25.23 mm) for both infinite distance focusing and nearest distance focusing for embodiment 1.

TABLE 2

| | Infinite Distance Focusing | | Nearest Distance Focusing (≈1 m) | |
|---|---|---|---|---|
| | maximum wide-angle state | maximum telephoto state | maximum wide-angle state | maximum telephoto state |
| variable distance 1: | 36.649 | 4.665 | 36.649 | 4.665 |
| variable distance 2: | 10.108 | 28.190 | 9.904 | 26.766 |
| variable distance 3: | 1.500 | 1.500 | 1.704 | 2.924 |

Figure 3A:
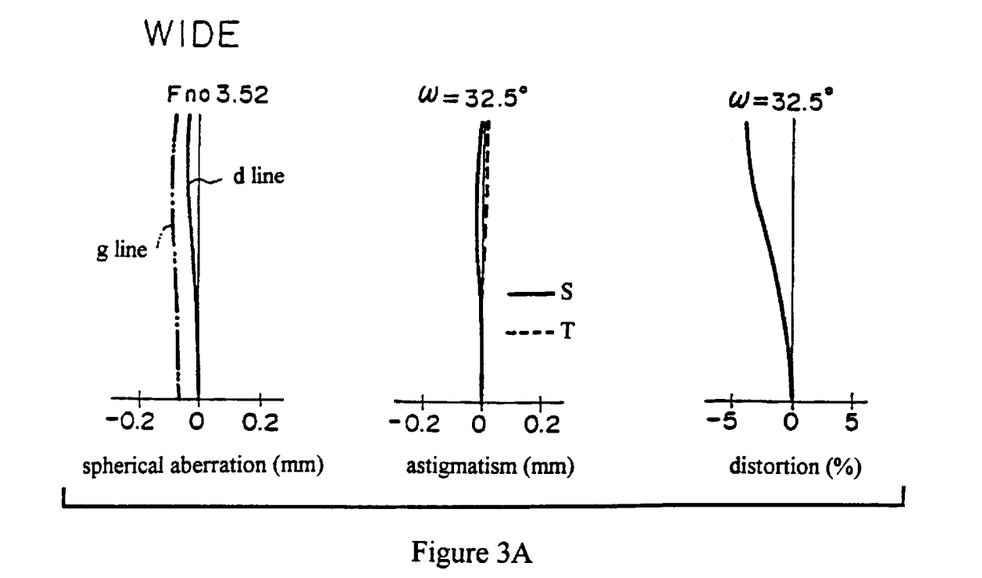
FIGS. 3A and 3B illustrate the spherical aberration, astigmatism and distortion when in the maximum wide-angle state and the maximum telephoto state, respectively, for a first embodiment of the invention.
Figure 3B:
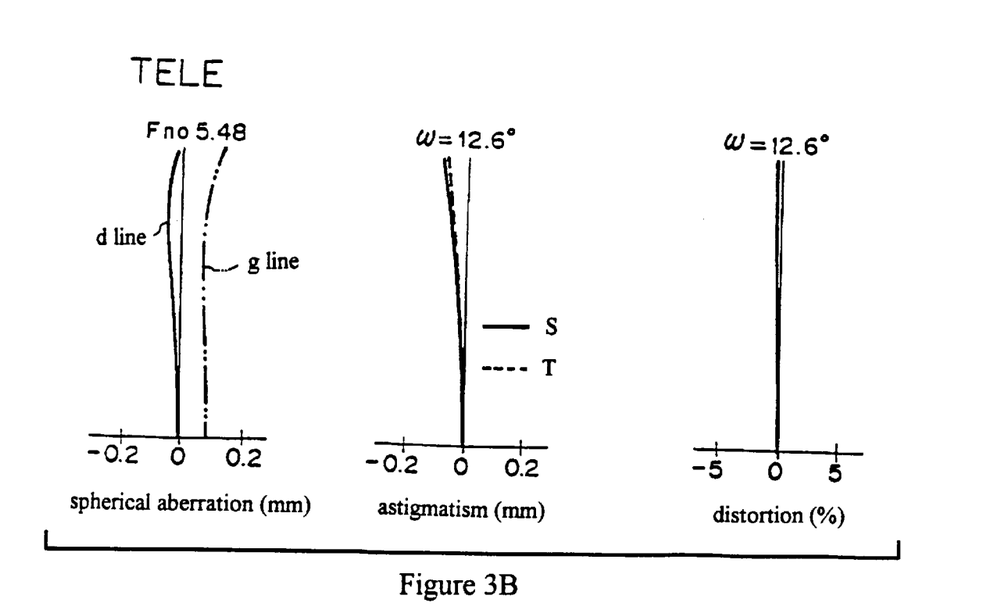

FIGS. 3A and 3B illustrate the spherical aberration, astigmatism and distortion which occur at the maximum wide-angle state and the maximum telephoto state, respectively, of the zoom lens of embodiment 1. As is evident from FIGS. 3A and 3B, favorable aberration correction is achieved in all areas of zooming for embodiment 1.

Embodiment 2

The zoom lens of embodiment 2 has the same lens element composition description as given above for embodiment 1 and thus, the description will not be repeated. Table 3, below, shows the values of the radius of curvature R (in mm) of each lens element surface, the on-axis surface spacing D (in mm), as well as the values of the index of refraction $n_d$ and the Abbe number $v_d$ (for the sodium d line) of each lens element of the zoom lens which apply to embodiment 2. The surface numbers # in the table indicate the surface order from the photographic object side. Further, in the lower section of Table 3, the values for the focal distance f, fnumber $F_{No.}$ and the angle of view 2ω are indicated.

TABLE 3

| # | R | D | $n_d$ | $v_d$ |
|---|---|---|---|---|
| 1 | 120.673 | 2.600 | 1.74399 | 44.8 |
| 2 | −288.617 | 0.150 | | |
| 3 | 42.850 | 1.200 | 1.81600 | 46.6 |
| 4 | 11.041 | 4.675 | | |
| 5 | −50.663 | 1.200 | 1.71299 | 53.9 |
| 6 | 30.799 | 0.700 | | |
| 7 | 20.333 | 3.550 | 1.80099 | 35.0 |
| 8 | −431.518 | variable distance 1 | | |
| 9 | shutter stop | 1.500 | | |
| 10 | 13.278 | 3.500 | 1.81600 | 46.6 |

TABLE 3-continued

| # | R | D | $n_d$ | $v_d$ |
|---|---|---|---|---|
| 11 | −60.221 | 0.150 | | |
| 12 | 16.590 | 2.700 | 1.74320 | 49.3 |
| 13 | 25.929 | 0.868 | | |
| 14 | −18.929 | 2.000 | 1.80518 | 25.4 |
| 15 | 10.200 | 1.537 | | |
| 16 | 1056.621 | 3.200 | 1.80400 | 46.6 |
| 17 | −18.265 | variable distance 2 | | |
| 18 | 25.528 | 3.500 | 1.51680 | 64.2 |
| 19 | −39.794 | variable distance 3 | | |
| 20 | ∞ | 4.200 | 1.51680 | 64.2 |
| 21 | ∞ | | | |
| f = 9.76 mm–27.33 mm | | $F_{No.}$ = 3.52–5.52 | | 2ω = 60.6°–23.3° |

Table 4, below, indicates the ranges for variable distance 1, variable distance 2, and variable distance 3 which are applicable when zooming from the maximum wide-angle state (f=9.76 mm) to the maximum telephoto state (f=27.33 mm) for both infinite distance focusing and nearest distance focusing for embodiment 2.

TABLE 4

| | Infinite Distance Focusing | | Nearest Distance Focusing | |
|---|---|---|---|---|
| | maximum wide-angle state | maximum telephoto state | maximum wide-angle state | maximum telephoto state |
| variable distance 1: | 34.350 | 3.283 | 34.350 | 3.283 |
| variable distance 2: | 10.020 | 29.072 | 9.790 | 27.466 |
| variable distance 3: | 2.000 | 2.000 | 2.230 | 3.606 |

Figure 4A:
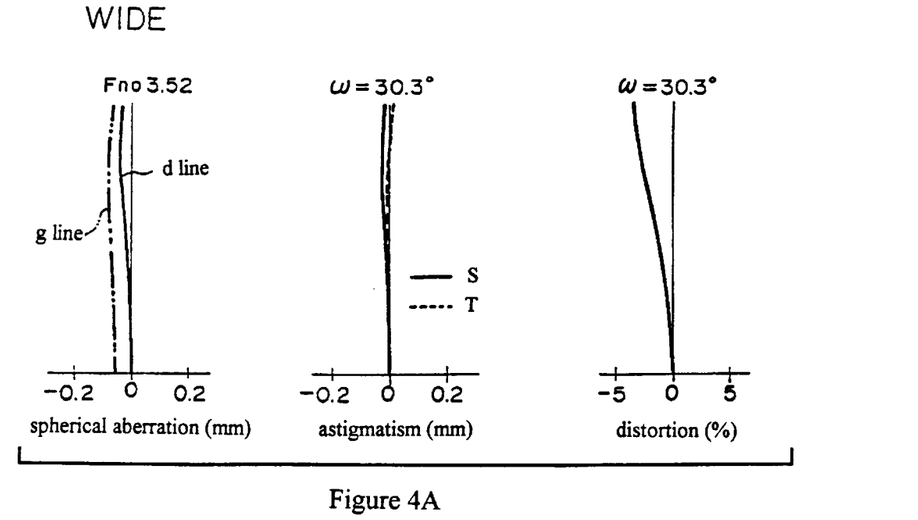
FIGS. 4A and 4B illustrate the spherical aberration, astigmatism and distortion when in the maximum wide-angle state and the maximum telephoto state, respectively, for a second embodiment of the invention.
Figure 4B:
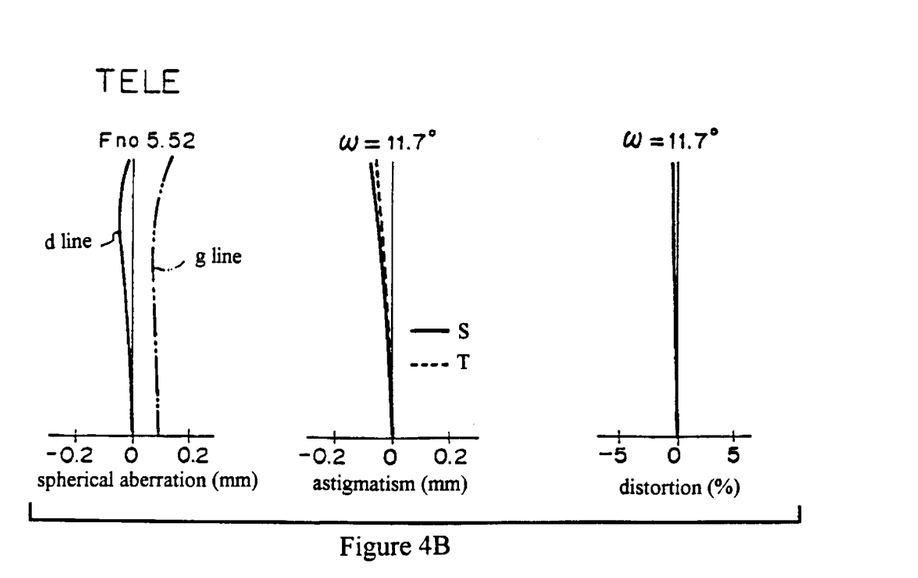

FIGS. 4A and 4B illustrate the spherical aberration, astigmatism and distortion at the maximum wide-angle state and the maximum telephoto state, respectively, of embodiment 2. As is evident from FIGS. 4A and 4B, favorable aberration correction is achieved in all areas of zooming for embodiment 2.

Moreover, for both embodiment 1 and embodiment 2, conditional expressions (1)–(4) above are all satisfied. The numerical values of the ratio (i.e., the middle term) of each of conditional expressions (1)–(4) are given in Table 5 below.

TABLE 5

| | Embodiment 1 | Embodiment 2 |
|---|---|---|
| conditional expression (1): $D_{wm}/f_3$ | 0.96 | 0.94 |
| conditional expression (2): $D_{ti}/f_3$ | 1.57 | 1.56 |
| conditional expression (3): $B_{fi}/f_3$ | 0.19 | 0.20 |
| conditional expression (4): $f_2/f_w$ | 2.48 | 2.32 |

Furthermore, the three-group zoom lens of the present invention is not limited to that described in the embodiments above. For example, appropriate selection of the number of lens elements and their shapes is possible for the composition of each lens group.

As described above, by satisfying conditional expressions (1) and (2), it is possible to establish the pupil exit position in a position which is sufficiently far from the photographic image plane so as to secure a suitable magnification ratio. In this way, it becomes possible to allow the luminous flux to be incident nearly perpendicularly onto the photographic image plane, thereby making it possible to prevent shading when these rays are incident onto a CCD array located at the image plane. Furthermore, by employing the rear focusing method, high speed focusing is achieved. In addition, by satisfying conditional expressions (1)–(2), an appropriate back focus can be obtained, thereby allowing space between the exit pupil and the image plane to accommodate one or more filter components. By satisfying conditional expression (3), it is possible to construct the third lens group using only a single lens element. Further, by satisfying conditional expression (4), aberrations are suppressed, the fluctuation with zooming of the distance from the photographic image plane to the exit pupil is reduced, and a high degree of compactness for the entire zoom lens system can be achieved.

The invention being thus described, it will be obvious that the same may be varied in many ways. Such variations are not to be regarded as a departure from the spirit and scope of the invention. All such modifications as would be obvious to one skilled in the art are intended to be included within the scope of the following claims.

What is claimed is:

1. A zoom lens for forming an image of an object onto a fixed-image element comprising, in order from a photographic object side:

a first lens group having a negative refractive power;

a second lens group having a positive refractive power; and a third lens group having a positive refractive power;

wherein at the time of zooming from a maximum wide-angle state to a maximum telephoto state, each of these lens groups are moved so that the spacing between the first lens group and the second lens group is shortened, and the spacing between the second lens group and the third lens group is lengthened, when focusing from an infinite distance to a near distance, the third lens group moves to the photographic object side, second lens group includes a shutter, and conditional expressions (1) and (2) below are satisfied $$0.8 < D_{wm}/f_3 < 1.1 \quad (1)$$

$$1.5 < D_{ti}/f_3 < 1.7 \quad (2)$$

where $f_3$ is the focal distance of the third lens group, $D_{wm}$ is the on-axis distance from the position of the shutter stop to the position of the lens surface on the extreme image-side of the third lens group at the time of near-distance focusing when in the maximum wide-angle state, and $D_{ti}$ is the on-axis distance from the position of the shutter stop to the position of the lens surface on the extreme image-side of the third lens group at the time of infinte-distance focusing when in the maximum telephoto state.

2. The three-group zoom lens according to claim 1, and further comprising:

said shutter of said second lens group being arranged at the extreme photographic object-side of said second lens group;

said third lens group being composed of only a double convex lens;

said three-group zoom lens satisfying conditional expression (3) below $$0.15 < B_{ft}/f_3 < 0.25 \quad (3)$$

where $B_{ft}$ is the back focus at the time of infinite-distance focusing when in the maximum telephoto state.

3. The three-group zoom lens according to claim 1, and further comprising said first lens group being composed of four lens elements and arranged, in order from the photographic object side, as follows: a positive lens, a negative meniscus lens with its concave surface on the image side, a double concave lens, and a positive lens having a stronger curvature surface on the photographic object side.

4. The three-group zoom lens according to claim 2, and further comprising said first lens group being composed of four lens elements and arranged, in order from the photographic object side, as follows: a positive lens, a negative meniscus lens with its concave surface on the image side, a double concave lens, and a positive lens having a stronger curvature surface on the photographic object side.

5. The three-group zoom lens according to claim 1, and further comprising said second lens group being composed of four lens elements and arranged, in order from the photographic object side, as follows: a double convex lens, a positive meniscus lens with its convex surface on the photographic object side, a double concave lens, and a positive lens having a stronger curvature surface on the photographic object side.

6. The three-group zoom lens according to claim 1, and further comprising said third lens group being composed of only a double-convex lens, and said three-group zoom lens satisfying conditional expression (4) below $$2.1 < f_2/f_w < 2.7 \quad (4)$$

wherein $f_2$ is the focal distance of the second lens group, and $f_w$ is the focal distance of the three-group zoom lens when in the maximum wide-angle state.

7. A zoom lens comprising the construction parameters as set forth below:

| # | R | D | $n_d$ | $v_d$ |
|---|---|---|---|---|
| 1 | 122.395 | 2.70 | 1.74399 | 44.8 |
| 2 | −246.925 | 0.150 | | |
| 3 | 42.223 | 1.200 | 1.816 | 46.6 |
| 4 | 10.859 | 5.147 | | |
| 5 | −48.119 | 1.200 | 1.71299 | 53.9 |
| 6 | 30.098 | 0.700 | | |
| 7 | 20.463 | 3.700 | 1.80099 | 35.0 |
| 8 | −385.560 | variable distance 1 | | |
| 9 | shutter stop | 1.500 | | |
| 10 | 13.401 | 3.500 | 1.81600 | 46.6 |
| 11 | −61.489 | 0.150 | | |
| 12 | 16.619 | 2.700 | 1.74320 | 49.3 |
| 13 | 26.334 | 0.936 | | |
| 14 | −18.840 | 2.000 | 1.80518 | 25.4 |
| 15 | 10.311 | 1.322 | | |
| 16 | 787.376 | 3.200 | 1.78800 | 47.4 |
| 17 | −17.717 | variable distance 2 | | |
| 18 | 25.182 | 3.500 | 1.51680 | 64.2 |
| 19 | −38.026 | variable distance 3 | | |
| 20 | ∞ | 4.200 | 1.51680 | 64.2 |
| 21 | ∞ | | | |

-continued

|  | Infinite Distance Focusing | | Nearest Distance Focusing | |
|---|---|---|---|---|
|  | maximum wide-angle state | maximum telephoto state | maximum wide-angle state | maximum telephoto state |
| variable distance 1: | 36.649 | 4.665 | 36.649 | 4.665 |
| variable distance 2: | 10.108 | 28.190 | 9.904 | 26.766 |
| variable distance 3: | 1.500 | 1.500 | 1.704 | 2.924 | where R is the radius of curvature of surface # in mm, D is the on-axis surface spacing, $n_d$ is the index of refraction, and $v_d$ is the Abbe number.

8. A zoom lens comprising the construction parameters as set forth below:

| # | R | D | $n_d$ | $v_d$ |
|---|---|---|---|---|
| 1 | 120.673 | 2.600 | 1.74399 | 44.8 |
| 2 | −288.617 | 0.150 | | |
| 3 | 42.850 | 1.200 | 1.81600 | 46.6 |
| 4 | 11.041 | 4.675 | | |
| 5 | −50.663 | 1.200 | 1.71299 | 53.9 |
| 6 | 30.799 | 0.700 | | |
| 7 | 20.333 | 3.550 | 1.80099 | 35.0 |
| 8 | −431.518 | variable distance 1 | | |
| 9 | shutter stop | 1.500 | | |
| 10 | 13.278 | 3.500 | 1.81600 | 46.6 |
| 11 | −60.221 | 0.150 | | |
| 12 | 16.590 | 2.700 | 1.74320 | 49.3 |
| 13 | 25.929 | 0.868 | | |
| 14 | −18.929 | 2.000 | 1.80518 | 25.4 |
| 15 | 10.200 | 1.537 | | |
| 16 | 1056.621 | 3.200 | 1.80400 | 46.6 |
| 17 | −18.265 | variable distance 2 | | |
| 18 | 25.528 | 3.500 | 1.51680 | 64.2 |
| 19 | −39.794 | variable distance 3 | | |
| 20 | ∞ | 4.200 | 1.51680 | 64.2 |
| 21 | ∞ | | | |

|  | Infinite Distance Focusing | | Nearest Distance Focusing | |
|---|---|---|---|---|
|  | maximum wide-angle state | maximum telephoto state | maximum wide-angle state | maximum telephoto state |
| variable distance 1: | 34.350 | 3.283 | 34.350 | 3.283 |
| variable distance 2: | 10.020 | 29.072 | 9.790 | 27.466 |
| variable distance 3: | 2.000 | 2.000 | 2.230 | 3.606 | where R is the radius of curvature of surface # in mm, D is the on-axis surface spacing in mm, $n_d$ is the index of refraction, and $v_d$ is the Abbe number.

* * * * *

UNITED STATES PATENT AND TRADEMARK OFFICE
CERTIFICATE OF CORRECTION

PATENT NO. : 5,909,318
DATED : Jun. 1, 1999
INVENTOR(S) : Tanaka

It is certified that error appears in the above-identified patent and that said Letters Patent is hereby corrected as shown below:

At Col.3, line 11, change "$f_2$ is the focal distance of the three-group zoom lens when" to -- $f_w$ is the focal distance of the three-group zoom lens when--

Signed and Sealed this

Seventh Day of September, 1999

Attest:

Q. TODD DICKINSON

Attesting Officer

Acting Commissioner of Patents and Trademarks